United States Patent [19]
Fukuda et al.

[11] Patent Number: 5,765,063
[45] Date of Patent: Jun. 9, 1998

[54] MULTI-DIRECTION CAMERA

[75] Inventors: Takeshi Fukuda; Hiroyuki Kawamura, both of Tokyo, Japan

[73] Assignee: Niles Parts Co., Ltd., Japan

[21] Appl. No.: 653,840

[22] Filed: May 28, 1996

[30] Foreign Application Priority Data

Jun. 22, 1995 [JP] Japan ................................. 7-179351
Jun. 22, 1995 [JP] Japan ................................. 7-179352

[51] Int. Cl.$^6$ ............... G03B 37/00; G03B 15/00; G03B 39/00; H04N 13/02
[52] U.S. Cl. ............... 396/332; 396/351; 396/429; 348/49
[58] Field of Search ............... 354/95, 150, 68, 354/117; 348/46, 49, 335; 396/9, 322, 332, 351, 429

[56] References Cited

U.S. PATENT DOCUMENTS

| | | |
|---|---|---|
| 2,299,002 | 10/1942 | Austin . |
| 2,736,250 | 2/1956 | Papritz . |
| 4,911,530 | 3/1990 | Lo ............... 350/132 |
| 5,349,403 | 9/1994 | Lo ............... 354/114 |
| 5,555,312 | 9/1996 | Shima et al. ............... 382/104 |

FOREIGN PATENT DOCUMENTS

1-109447  7/1989  Japan .

*Primary Examiner*—Michael L. Gellner
*Assistant Examiner*—Daniel Chapik
*Attorney, Agent, or Firm*—Ronald P. Kananen

[57] ABSTRACT

A multi-direction camera is provided in which a mirror (3) having a plurality of reflecting surfaces (31, 32) is disposed in front of a lens (4). The mirror (3) reflects the light from a plurality of directions and the lens (4) receives the reflected light to form an image on an image sensing device (7). In a first embodiment, a partitioning plate (81) is provided between the lens (4) and the edge line (33) of the mirror (3). The partitioning plate (81) optically isolates a plurality of reflecting surfaces (31, 32) to prevent a ghost image from appearing in the image taken. In a second embodiment, the mirror (3) is enclosed by an opaque cover (2), and the cover (2) has a transparent window (21, 22) opposing each of the plurality of reflecting surfaces (31, 32). The shields (23, 24), which are formed as a part of the window (21, 22), are arranged at locations away from the lens (4) such that an image of the shield is received by the lens (4). The present invention provides an improved multi-direction camera in which no ghost image appears in a video image taken through the camera, and in which a clear boundary line is provided between a plurality of sensed video images without using electrical means.

5 Claims, 6 Drawing Sheets

MULTI-DIRECTION CAMERA

BACKGROUND OF THE INVENTION

1. Field of the Invention

The present invention relates generally to multi-direction cameras for sensing images that are entering from many directions, such as directions to the left and right of a vehicle, and particularly to an improved multi-direction camera capable of simultaneously taking pictures in a plurality of directions.

2. Description of the Related Art

When an automobile enters, for example, a crossing, the driver must be aware of other oncoming vehicles for safety irrespective of whether there are traffic lights at the crossing or not. If the crossing is a blind corner, it is difficult to check the traffic conditions on the roads that cross the road on which the automobile is traveling.

In view of the aforementioned problem, Japanese Unexamined Utility Model Publication Hei No. 1-109447 discloses a multi-direction camera where the traffic condition on the crossing road may be checked for safety on the basis of the images taken by a camera mounted on the forward end portion of the automobile.

Figure 6:
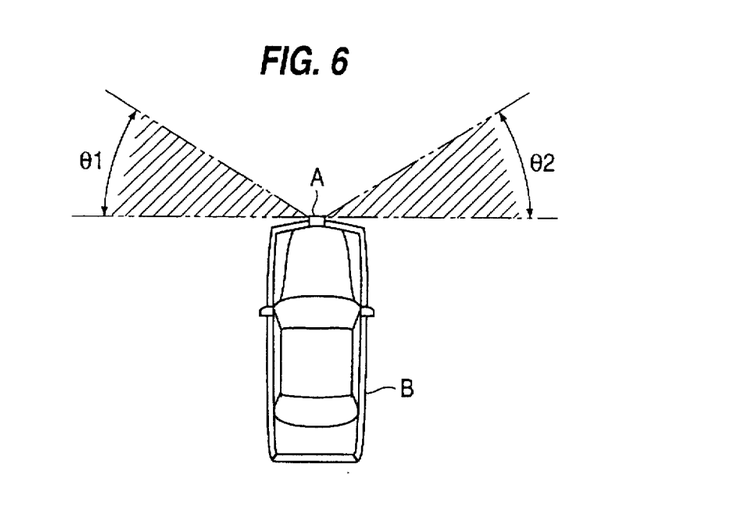
FIG. 6 is a top view of an automobile equipped with a multi-direction camera.

FIGS. 6 to 10 show a prior art multi-direction camera. FIG. 6 is a top view of an automobile B on which a multi-direction camera A is mounted, and shows angles of view θ1 and θ2 in which the camera shoots images in the directions to the left and right of the automobile.

Figure 7:
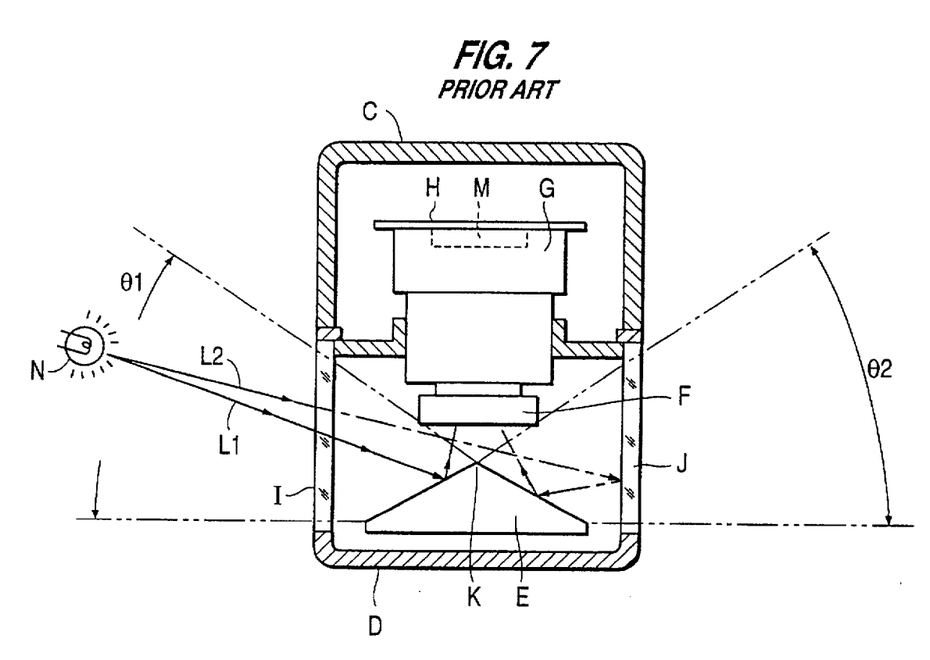
FIG. 7 is a cross-sectional view of a prior art multi-direction camera.

The multi-direction camera A is constructed as shown in FIG. 7. The multi-direction camera A includes a case C, cover D, mirror E, lens F, lens mount G, circuit board H, and windows I and J. The mirror E reflects light L1, which is incident from the left and right directions with respect to an edge line K of the mirror E. The lens F receives the reflected light and causes an image to be formed on an image-sensing device M in the form of a CCD (charge coupled device) mounted on the circuit board H. In this manner, the multi-direction camera A takes the left and right images viewed in the directions to the left and right of the automobile B, the angle of view being θ1 and θ2, respectively.

However, the aforementioned prior art multi-direction camera has several drawbacks.

Figure 8:
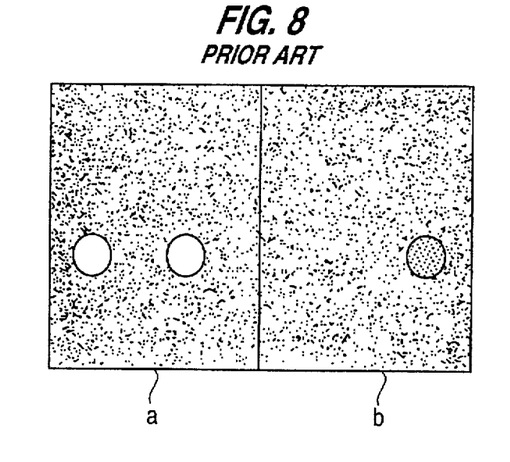
FIG. 8 illustrates a video image in which a ghost image appears due to the prior art construction shown in FIG. 7.

A first drawback is that ghost images appear in the video image due to various reflections occurring within the multi-direction camera A. The principle of how these ghost images are produced will be described with reference to FIGS. 7 and 8. For example, at night, the left window I receives light beams L1 from light sources N, such as head lights of another vehicle oncoming from the left side of the automobile. The light beams L1 are reflected by the mirror E and are then received by the lens F, which in turn forms images on the CCD device M. Thus, the image of the head light sources N appear in the left image a as shown in FIG. 8. If there is no light source on the road to the right of the automobile, no image should appear in the right image b in FIG. 8. However, light beams L2 incident through the left window I are reflected by the right window J as shown in FIG. 7, and are further reflected by the mirror E. The reflected light beams are received by the lens F, which in turn forms images of the light beams L2 on the CCD device M. The light beams L2 result in a ghost image of the light sources N in the right image b, as shown in FIG. 8.

Figure 9:
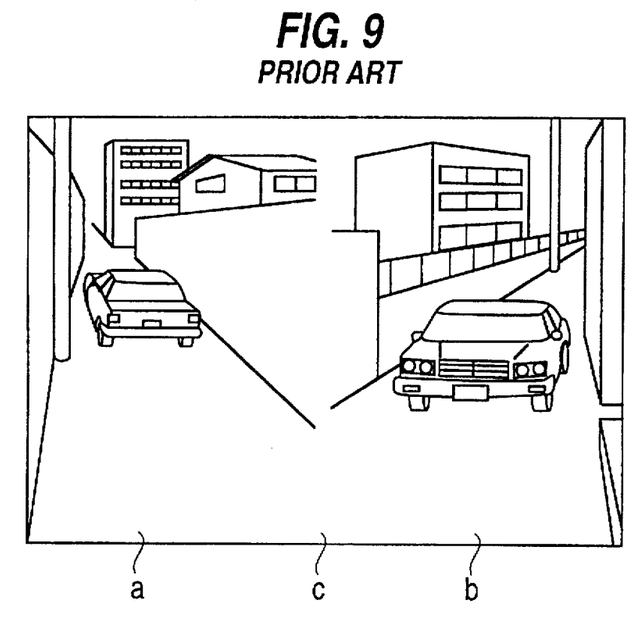
FIG. 9 illustrates a video image taken with a prior art camera in which there is nothing to indicate the boundary between the left image and the right image.

A second drawback is that the left and right images a and b formed on the CCD device M are not clearly bounded by a boundary line c. For example, there is nothing to indicate

Figure 10:
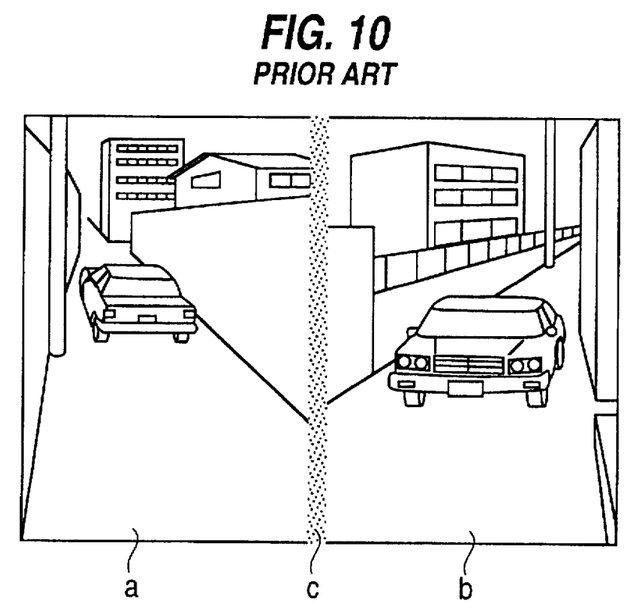
FIG. 10 illustrates a blurred boundary between the left image and the right image due to the prior art construction shown in FIG. 7.

2 the boundary c as shown in FIG. 9, so that the left image a is not clearly distinguished from the right image b, or the left and right images are not quite focused near the boundary c, as shown in FIG. 10. The latter case is due to the fact that the edge line K of the mirror E appears as a part of the image of the boundary line c, but is not quite focused since the edge line K is too close to the lens F to be accurately focused. In order to solve the second drawback, a superimposing circuit may be employed in order to display the left and right images a and b with the boundary line c electrically superimposed therebetween. However, superimposing a boundary line c is not preferable since such construction increases the cost of the multi-direction camera.

SUMMARY OF THE INVENTION

An object of the present invention is to solve the problems associated with the conventional multi-direction camera described above.

It is thus an object of the present invention to provide an improved multi-direction camera in which a ghost image does not appear in the sensed video image.

It is a further object of the present invention to provide an improved multi-direction camera in which a clear boundary line is formed between a plurality of sensed images without using electrical means.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with one aspect of the present invention, in order to overcome the first drawback described above, the invention comprises a multi-direction camera in which a mirror having a plurality of reflecting surfaces is disposed in front of a lens, the mirror reflects light beams from a plurality of directions to the lens, and the lens receives the reflected light beams to form images on the image sensing device, wherein a partitioning plate is provided to optically isolate between the plurality of reflecting surfaces. This construction has an advantage that no image ghost appears in the sensed video image.

It is preferred that the aforementioned partitioning plate is disposed between the lens and the edge line that lies between the plurality of reflecting surfaces of the mirror.

It is also preferred that one of the plurality of reflecting surfaces is oriented to face a direction to the left of an automobile, and the other is oriented to face a direction to the right of the automobile.

It is also preferred that the lens is disposed at the forward end portion of the automobile, and the lens is oriented such that a light receiving face of the lens faces a direction opposite to a traveling direction of the automobile. The lens oriented to face a direction opposite to the direction of travel of the automobile provides video images such that the images formed on the surface of the image sensing device is the same as what the driver sees by his eyes, i.e., the left and right image do not appear on the each opposite position in the displayed image. This provides good visibility and eliminates the need for electrically interchanging the positions of the left and right images in the displayed video image.

In accordance with another aspect of the present invention, in order to overcome the second drawback described above, the present invention provides a multi-direction camera in which a mirror having a plurality of reflecting surfaces is disposed in front of a lens, the mirror reflects the light from a plurality of directions, and the lens receives the reflected light to form an image on an image sensing device, wherein a shield is provided at a location away from the lens such that a part of an image of the shield serves as a boundary line between the images.

It is preferred that the mirror is enclosed by an opaque cover, the cover has a transparent window opposing each of the reflecting surfaces, the window has a frame, and part of the frame serves as the shield. It is also preferred that a length of tape is attached, which extends inwardly from one side of a frame of the window in such a direction as to close the window to serve as the shield. It is also preferred that the shield is provided in proximity to the window within the cover.

BRIEF DESCRIPTION OF THE DRAWINGS

Preferred embodiments of the present invention will be described in detail hereinafter with reference to FIGS. 1 to 5. In the drawings.

DETAILED DESCRIPTION OF THE PREFERRED EMBODIMENTS

A first embodiment of the invention will now be described with reference to FIGS. 1 to 4.

Figure 1:
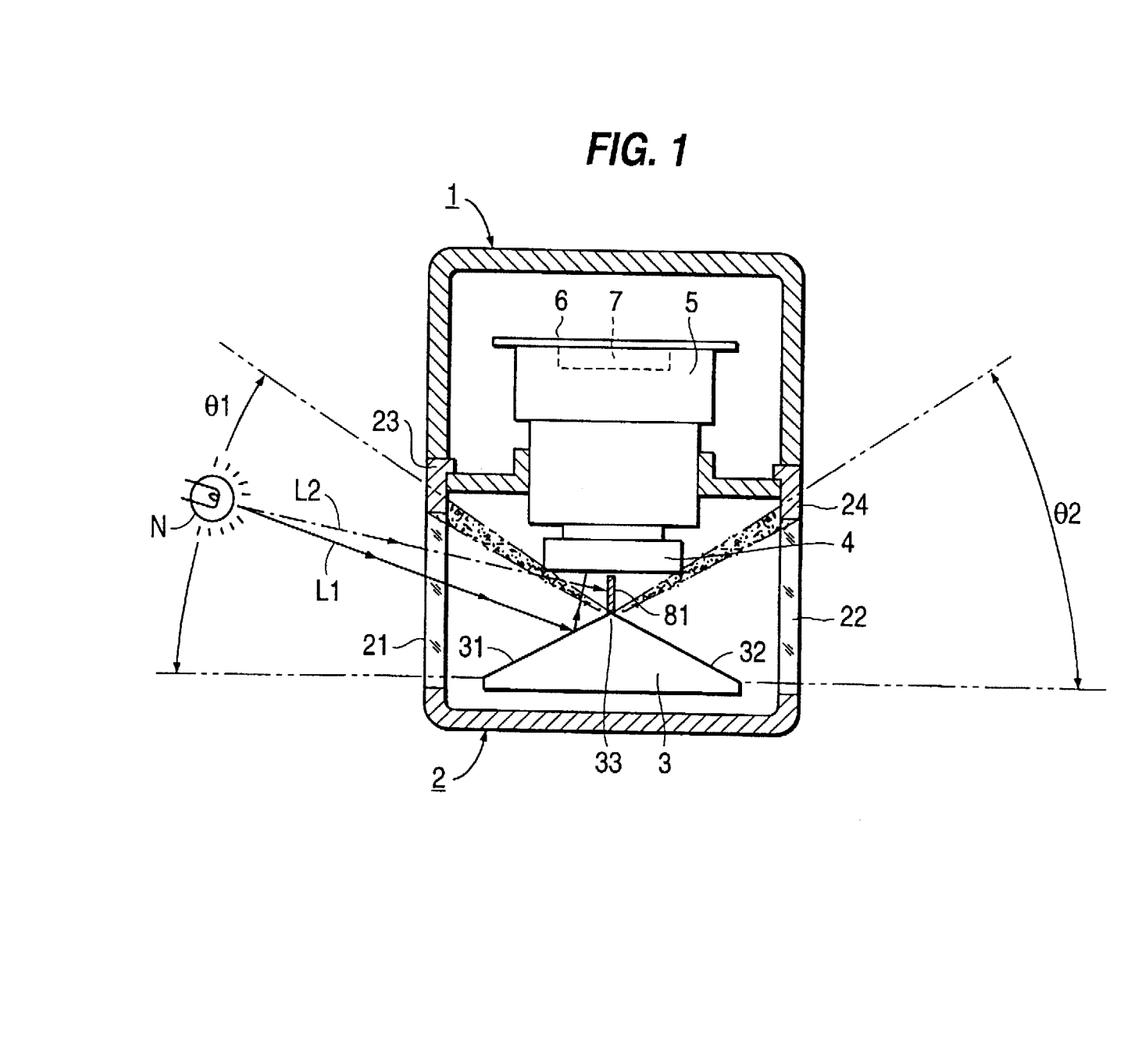
FIG. 1 is a cross sectional view showing an essential part of a multi-direction camera according to a first embodiment of the present invention.
Figure 2:
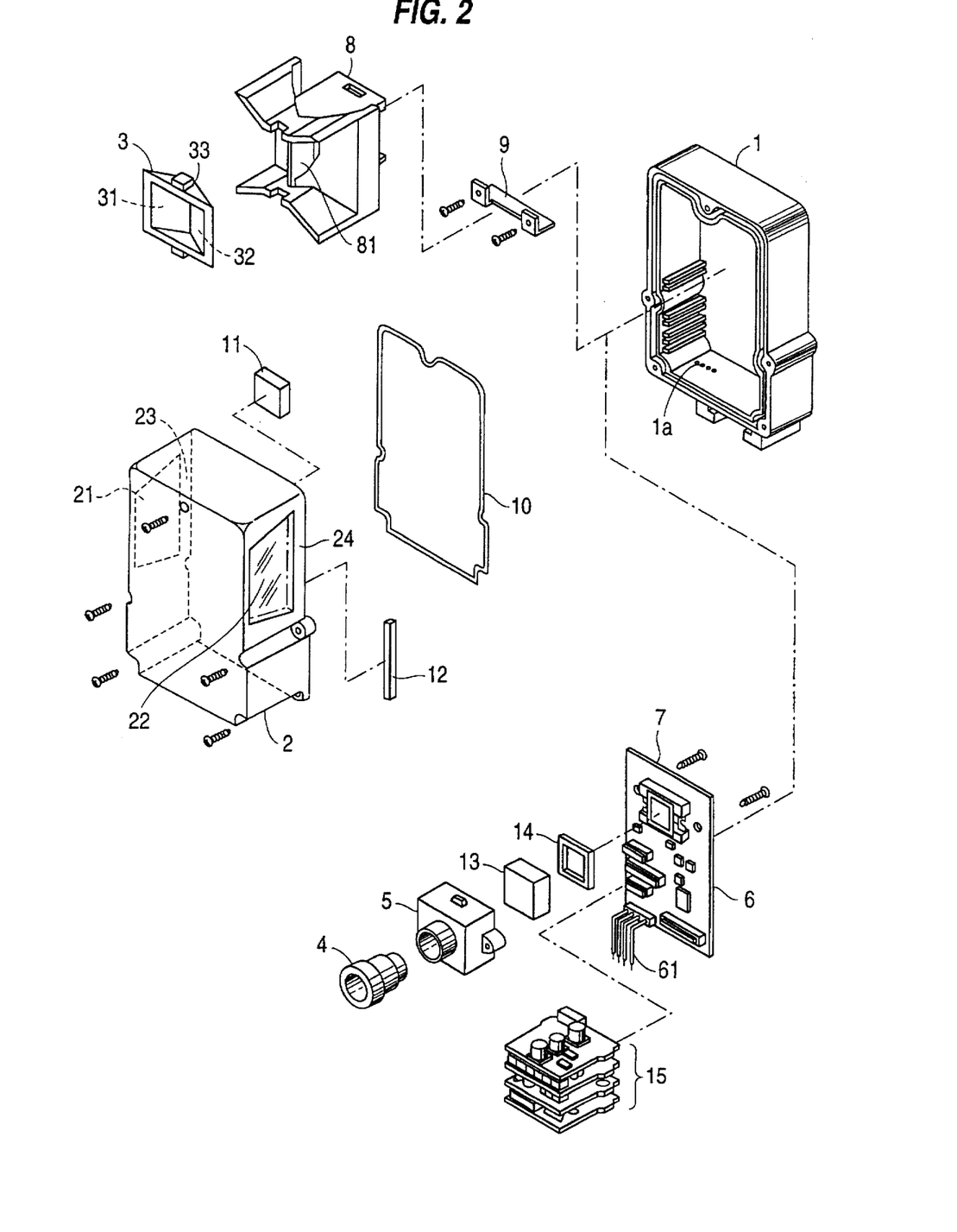
FIG. 2 is an exploded perspective view of the construction shown in FIG. 1.

As shown in FIGS. 1 and 2, a multi-direction camera according to the present invention includes a case 1, a cover 2, a mirror 3, a lens 4, a lens mount 5, a circuit board 6, an image-sensing device 7, a mirror holder 8, a fixing plate 9, a packing 10, vibration isolating rubber members 11 and 12, a filter 13, a spacer 14, and a sub circuit board 15. These structural elements are described in detail below.

The case 1 is formed of an opaque material and assembled to the cover 2 to form a housing for the camera. A packing 10 is inserted between the case 1 and the cover 2 to form a water-tight construction.

The cover 2 is opaque except for left and right windows 21 and 22. The cover 2 is constructed by an appropriate process, for example, by insert-molding the left and right windows 21 and 22 formed of a transparent acrylic resin into an opaque member, or by first forming the entire cover 2 of a transparent acrylic resin and then applying a black pigment to the cover 2 with the left and right windows 21 and 22 left unpainted.

The cover 2 has shields 23 and 24. The shields 23 and 24 are located such that the lens 4 receives a part of each of black images of the shields 23 and 24, and the black images serve as a boundary line c between the left image a and the right image h.

The mirror 3 is molded of a synthetic resin and has triangular side surfaces and two reflecting surfaces 31 and 32 on which aluminum is vapor-deposited to form mirror surfaces thereon. The two reflecting surfaces 31 and 32 meet each other at an edge line 33.

The lens 4 condenses the light reflected by the reflecting surfaces 31 and 32 of the mirror 3 and has a focal plane thereof on the surface of the later described image sensing device 7. The image sensing device 7 is mounted on the circuit board 6, and the lens 4 is mounted on the circuit board 6 by means of the lens mount 5. The lens mount 5 includes a spacer 14 and a filter 13 that shields light having wavelengths other than visible light.

The circuit board 6 carries a sub board 15 and terminals 61 as well as the lens mount 5 supporting the lens 4. The terminals 61 extend outwardly through holes 1a in the case so that the circuit board 6 may be electrically connected via the terminals 61 to an AV (Audio Visual) apparatus, not shown, in the passenger space of the automobile. Between the circuit board 6 and the cover 2 are inserted vibration isolating rubber members 11 and 12 that resiliently support the circuit board 6.

The image sensing device 7 is a device for converting the light image formed on the surface thereof into an electrical video signal. The image sensing device takes the form of a CCD in this embodiment.

The mirror holder 8 is formed of an opaque material in one piece with the partitioning plate 81. The mirror holder 8 supports the mirror 3 and is fixed to the case 1 by means of a fixing plate 9. The partitioning plate 81 is provided on the edge line 33 and extends toward the lens 4. The partitioning plate 81 optically isolates the two reflecting surfaces 31 and 32 one from the other so that light from one surface does not enter the light path through which light from the other surface enters. This construction eliminates a ghost image. Thus, the light incident through the left window 21 is reflected only by the left reflecting surface 31 and does not enter the right reflecting surface 32. Likewise, the light incident through the right window 22 is reflected only by the right reflecting surface 32 and does not enter the left reflecting surface 31.

The multi-direction camera of the aforementioned construction is mounted on the forward end portion of the automobile, for example, near the bumper. The lens is oriented to face a direction opposite to the direction of travel of the automobile. The left reflecting surface 31 is oriented to face a direction to the left of the automobile and the right reflecting surface 32 to face a direction to the right of the automobile. Orienting the lens to face a direction opposite to the direction of travel of the automobile provides video images such that the images formed on the surface of image sensing device 7 and displayed on the screen of the AV apparatus are the same as what the driver sees by his eyes, i.e., the left image does not appear on the right in the displayed image and the right image does not appear on the left. This provides good visibility.

The operation of the first embodiment will now be described.

Figure 3:
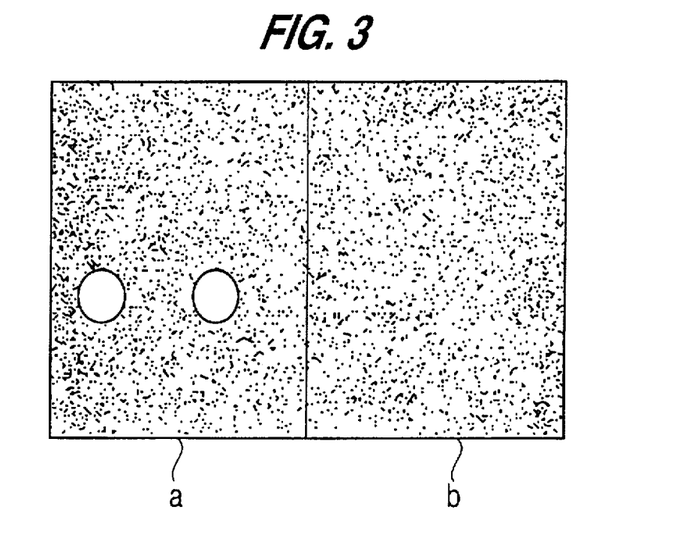
FIG. 3 illustrates a video image in which the construction shown in FIG. 1 prevents a ghost from appearing.

For example, at night, when a light beam L1 enters through the left window 21 from the light source N, such as a head light of another vehicle to the left of the automobile, as shown in FIG. 1, the light beam L1 is reflected by the left reflecting surface 31 of the mirror 3, and the lens 4 receives the reflected light beam to form an image on the image sensing device 7. Thus, an image of the light source N appears in the left image a, as shown in FIG. 3. Since there is no light source in the direction to the right of the automobile, no image appears in the right image b in FIG. 3.

Figure 4:
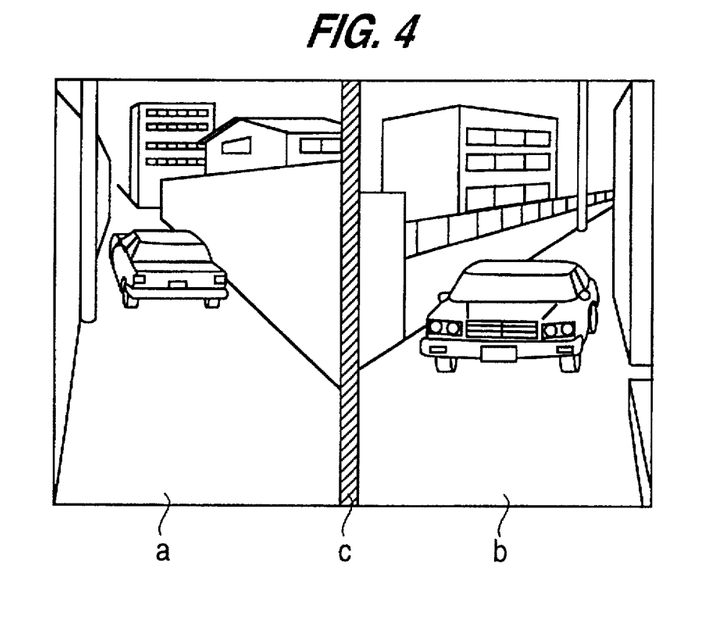
FIG. 4 illustrates a video image in which the construction shown in FIG. 1 provides a clear boundary line.

The mirror 3 reflects light incident upon the reflecting surfaces 31 and 32 thereof from the directions to the left and right of the automobile, with the angles of view being θ1 and θ2, respectively. The lens 4 receives the light reflected by the mirror 3 to form images on the surface of the image sensing device 7. The left image a is formed by the light incident through the left angle of view θ1 and the right image b by the light incident through the right angle of view θ2, as shown in FIG. 4. The black images of the shields 23 and 24 received by the lens 4 are also formed midway between the left image a and the right image b, serving as the boundary line c. Since the shields 23 and 24 are away from the lens 4, the images of the shields 23 and 24 are well focused to form a clear image of the boundary line c.

The first embodiment of the present invention provides a multi-direction camera in which a mirror having a plurality of reflecting surfaces is disposed in front of a lens, the mirror reflects the light from a plurality of directions, and the lens receives the reflected light to form an image on an image sensing device. The camera is characterized in that the partitioning plate 81 is provided between the lens and the edge line, which lies between a plurality of reflecting surfaces, so as to optically isolate the plurality of reflecting surfaces from one another. This construction has an advantage that no ghost image appears in the sensed video image.

The lens oriented to face a direction opposite to the direction of travel of the automobile provides video images such that the images formed on the surface of the image sensing device is the same as what the driver sees by his eyes, i.e., the left and right images do not appear on each opposite position in the displayed image. This provides good visibility and eliminates the need for electrically interchanging the positions of the left and right images in the displayed video image.

Figure 5:
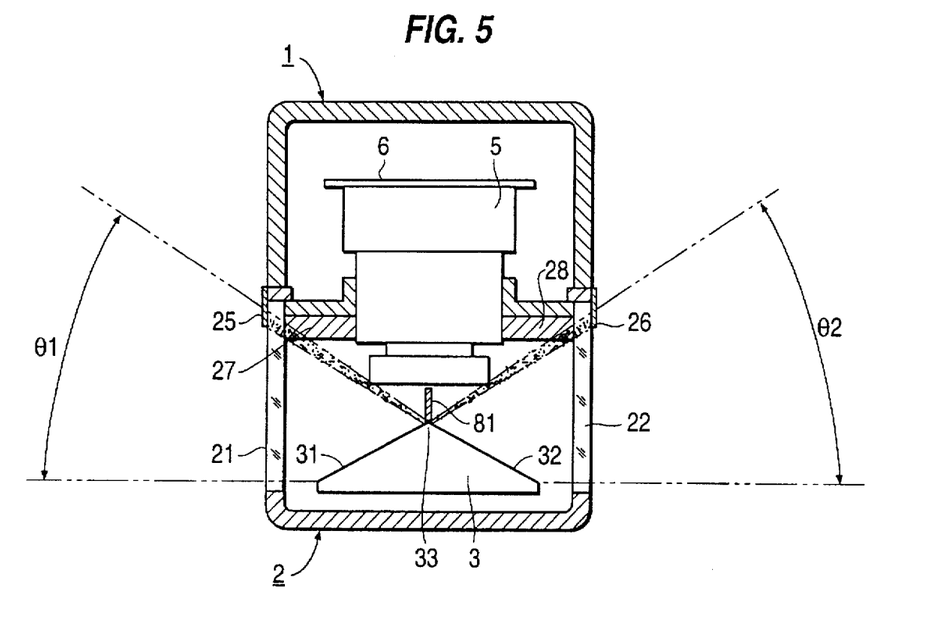
FIG. 5 is a cross-sectional view of an essential part of a multi-direction camera according to a second embodiment of the present invention.

FIG. 5 shows a second embodiment of the invention. The construction of the second embodiment differs from the first embodiment with respect to the shields 25, 26, 27, and 28. Thus, only the shields 25, 26, 27, and 28 are described, and a description of the rest of the second embodiment has been omitted. Although the shields 25 and 26 differ from the shields 27 and 28 in type, they are shown in FIG. 5 together for convenience of explanation.

The shields 25 and 26 of one type are, for example, an opaque tape stuck to the cover 2. The use of an opaque tape lends itself to, for example, improving existing products.

The shields 27 and 28 of the other type are in the form of a black plate provided within the cover 2. If the light entering the camera from outside is reflected by the surface of the shields 27 and 28, such reflection results in poor performance of the multi-direction camera. Therefore, the surfaces of the shields 27 and 28 are preferably rough surfaces.

The second embodiment of the present invention provides a multi-direction camera in which a mirror having a plurality of reflecting surfaces is disposed in front of a lens, the mirror reflects the light from a plurality of directions, and the lens receives the reflected light to form an image on an image sensing device. The camera is characterized in that a shield is provided at a location away from the lens such that part of an image of the shield serves as a boundary between the left and right images.

This construction is advantageous in that a clear boundary line may be provided between a plurality of video images without using electrical means. Moreover, the present invention provides a multi-direction camera in which the mirror is enclosed by an opaque cover, the cover has a transparent window opposing each of the reflecting surfaces, and a shield is provided. The shield may be formed by using a part of the frame of the window or by attaching a length of tape to one side of the frame which extends inwardly in such a direction as to close the window, or by forming a shield in the proximity to the window within the cover. This facilitates formation of a clear boundary.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A multi-direction camera in which a lens (4) is disposed in front of a mirror (3) having a plurality of reflecting surfaces (31, 32), the mirror (3) reflects light from a plurality of directions, and the lens (4) receives the reflected light to form images on an image sensing device (7);

wherein a partitioning plate (81) is provided to optically isolate the plurality of reflecting surfaces (31, 32), said partitioning plate (81) being disposed between the lens (4) and an edge line (33) of the mirror that lies between the plurality of reflecting surfaces (31, 32) of the mirror;

wherein one (31) of the plurality of reflecting surfaces (31, 32) is oriented to face a direction to the left of an automobile and the other (32) is oriented to face a direction to the right of the automobile; and wherein an opaque shield is provided at a location away from and in front of the lens (4), said shield having an edge which is generally parallel to said edge line (33) of the mirror, and said lens (4) being positioned completely in front of and spaced from a plane containing said edge of the shield and said edge line (33) of the mirror, said shield and said mirror being arranged such that a part of an image of the shield serves as a boundary line between the images formed on the image sensing device.

2. The multi-direction camera according to claim 1, wherein the lens (4) is disposed at a forward end portion of the automobile and the lens (4) is oriented such that a light receiving face of the lens faces a direction opposite to a traveling direction of the automobile.

3. A multi-direction camera in which a lens (4) is disposed in front of a mirror (3) having a plurality of reflecting surfaces (31, 32), the mirror (3) reflects light from a plurality of directions, and the lens (4) receives the reflected light to form images on an image sensing device (7);

wherein a partitioning plate (81) is provided to optically isolate the plurality of reflecting surfaces (31, 32), said partitioning plate (81) being disposed between the lens (4) and an edge line (33) of the mirror that lies between the plurality of reflecting surfaces (31, 32) of the mirror;

wherein one (31) of the plurality of reflecting surfaces (31, 32) is oriented to face a direction to the left of an automobile and the other (32) is oriented to face a direction to the right of the automobile;

wherein an opaque shield (23, 24) is provided at a location away from and in front of the lens (4), said shield having an edge which is generally parallel to said edge line (33) of the mirror, and said lens (4) being positioned completely in front of and spaced from a plane containing said edge of the shield and said edge line (33) of the mirror, said shield and said mirror being arranged such that a part of an image of the shield serves as a boundary line between the images; and wherein the mirror (3) is enclosed by an opaque cover (2), the cover (2) has a transparent window (21, 22) opposing each of the reflecting surfaces (31, 32), the window (21, 22) has a frame, and part of the frame serves as said shield (23, 24).

4. A multi-direction camera in which a lens (4) is disposed in front of a mirror (3) having a plurality of reflecting surfaces (31, 32), the mirror (3) reflects light from a plurality of directions, and the lens (4) receives the reflected light to form images on an image sensing device (7);

a wherein a partitioning plate (81) is provided to optically isolate the plurality of reflecting surfaces (31, 32), said partitioning plate (81) being disposed between the lens (4) and an edge line (33) of the mirror that lies between the plurality of reflecting surfaces (31, 32) of the mirror;

wherein one (31) of the plurality of reflecting surfaces (31, 32) is oriented to face a direction to the left of an automobile and the other (32) is oriented to face a direction to the right of the automobile;

wherein an opaque shield (23, 24) is provided at a location away from and in front of the lens (4), said shield having an edge which is generally parallel to said edge line (33) of the mirror, and said lens (4) being positioned completely in front of and spaced from a plane containing said edge of the shield and said edge line (33) of the mirror, said shield and said mirror being arranged such that a part of an image of the shield serves as a boundary line between the images; and wherein the mirror (3) is enclosed by an opaque cover (2), the cover (2) has a transparent window (21, 22) opposing each of the reflecting surfaces (31, 32), and said shield (23, 24) is provided in proximity to the window (21, 22) within the cover (2).

5. In combination, a multi-direction camera mounted on the front of an automobile, comprising:

a mirror (3) having first and second reflecting surfaces (31, 32) disposed at an angle to one another, said first reflecting surface being oriented to face a direction to the left of the automobile and said second reflecting surface being oriented to face a direction to the right of the automobile, said first and second reflecting surfaces forming an edge line (33) therebetween;

a lens (4) positioned in front of said mirror (3) to receive reflected light from said first and second reflecting surfaces (31, 32), said lens being spaced in front of said edge line (33);

an image sensing device (7) for forming images based upon the reflected light received by said lens (4);

a partitioning plate (81) extending between said edge line (33) and said lens (4) to optically isolate the first and second reflecting surfaces (31, 32); ad an opaque shield (23, 24) provided at a location away from and in front of to lens (4), said shield having an edge which is generally parallel to said edge line (33) of the mirror, said lens (4) being positioned completely in front of and spaced from a plane containing said edge of the shield and said edge line (33) of the mirror, said shield and said mirror being arranged such that a part of an image of the shield serves as a boundary line between the images formed on the image sensing device.

* * * * *